US012809737B2

(12) United States Patent
Sharpe et al.

(10) Patent No.: US 12,809,737 B2
(45) Date of Patent: Nov. 24, 2026

(54) SYSTEMS AND METHODS FOR GENERATING SYSTEM ALERTS

(71) Applicant: Capital One Services, LLC, McLean, VA (US)

(72) Inventors: Samuel Sharpe, Cambridge, MA (US); Christopher Bayan Bruss, Washington, DC (US); Brian Barr, Schenectady, NY (US)

(73) Assignee: Capital One Services, LLC, McLean, VA (US)

( * ) Notice: Subject to any disclaimer, the term of this patent is extended or adjusted under 35 U.S.C. 154(b) by 624 days.

(21) Appl. No.: 18/448,106

(22) Filed: Aug. 10, 2023

(65) Prior Publication Data

US 2025/0053491 A1 Feb. 13, 2025

(51) Int. Cl.

*G06N 3/045* (2023.01)
*G06F 11/32* (2006.01)
*G06F 11/34* (2006.01)
*G06N 20/00* (2019.01)

(52) U.S. Cl.

CPC ........ *G06F 11/327* (2013.01); *G06F 11/3433* (2013.01); *G06N 3/045* (2023.01); *G06N 20/00* (2019.01)

(58) Field of Classification Search

CPC ............... G06F 11/327; G06F 11/3433; G06N 3/045; G06N 20/00

See application file for complete search history.

(56) References Cited

U.S. PATENT DOCUMENTS

| | | | | |
|---|---|---|---|---|
| 10,936,961 | B1 * | 3/2021 | Jain | G06N 5/01 |
| 11,176,471 | B1 * | 11/2021 | DeCaprio | G06F 18/2115 |
| 12,293,304 | B1 * | 5/2025 | Jammalamadaka | G06N 20/00 |
| 2007/0262860 | A1 * | 11/2007 | Salinas | H04W 4/00 340/539.12 |
| 2020/0073953 | A1 * | 3/2020 | Kulkarni | G06N 3/08 |
| 2020/0104697 | A1 * | 4/2020 | Bhatia | G06N 3/0895 |

(Continued)

OTHER PUBLICATIONS

Bianchi, F., Rossiello, G., Costabello, L., Palmonari, M., & Minervini, P. (2020). Knowledge graph embeddings and explainable AI. arXiv preprint arXiv:2004.14843. (Year: 2020).*

(Continued)

*Primary Examiner* — John S. Wasaff
(74) *Attorney, Agent, or Firm* — Foley & Lardner LLP

(57) ABSTRACT

Systems and methods for executing resource availability notifications to user systems are described. In some aspects, the system receives, for a first plurality of user systems, a first plurality of user profiles and a plurality of resource availability values. Each user profile includes values for a set of features. The system processes a first machine learning model which generates resource availability values from the set of features and extracts an explainability vector. The system uses the explainability vector to generate an embedding map that translates feature values into a corresponding embedding in an embedding space. The system encodes a second plurality of user profiles and processes the resulting user profile vectors using a second machine learning model to generate clusters of user profile vectors. The system selects a cluster from the clusters of user profile vectors and determines user systems corresponding to the cluster for executing resource availability notifications.

20 Claims, 4 Drawing Sheets

(56) References Cited

U.S. PATENT DOCUMENTS

| | | | | |
|---|---|---|---|---|
| 2021/0067900 | A1* | 3/2021 | Griffith, Jr. | G06Q 30/0207 |
| 2022/0114186 | A1* | 4/2022 | Frazier | G06F 21/602 |
| 2022/0172105 | A1* | 6/2022 | Nia | G06N 5/045 |
| 2024/0119290 | A1* | 4/2024 | Lyons | G06N 20/00 |
| 2024/0168918 | A1* | 5/2024 | Pham | G06N 3/044 |

OTHER PUBLICATIONS

Lundberg, S. M., Erion, G. G., & Lee, S. I. (2018). Consistent individualized feature attribution for tree ensembles. arXiv preprint arXiv:1802.03888. (Year: 2018).*

* cited by examiner

SYSTEMS AND METHODS FOR GENERATING SYSTEM ALERTS

SUMMARY

Methods and systems are described herein for novel uses and/or improvements to artificial intelligence applications. As one example, methods and systems are described herein for identifying user systems similar to a particular user system and executing resource availability notifications to the identified user systems. The user systems similar to the particular user system may be identified using an embedding map which translates user profiles into an embedding space. The embedding map is generated using an explainability vector extracted from a machine learning model and represents an impact of input feature values for a user profile on a corresponding resource availability value output from a machine learning model.

Conventional systems have not contemplated leveraging an explainability vector for a machine learning model to generate embedding maps for recommendations or clustering data. For example, an explainability vector for a machine learning model for predicting resource consumption may shed light on which input factors correlate more, or less, with predicted resource consumption. While a conventional system for adjusting resource allocation may be unable to make direct use of the machine learning model, the explainability vector for the machine learning model may be used to map input data into an embedding space for the practical benefit of helping find user systems similar to a particular user system to provide resource availability notifications.

Therefore, the difficulty in adapting artificial intelligence models for this practical benefit faces several technical challenges such as how to leverage explainability vectors for a machine learning model to create an embedding space, how to map user systems into the embedding space, and how to leverage the mappings for the user systems in the embedding space to find user systems similar to a particular user system. To overcome these technical deficiencies in adapting artificial intelligence models for this practical benefit, methods and systems disclosed herein extract explainability vectors from machine learning models which speak to the importance of parameters to a first machine learning model. The explainability vectors are then used to generate embedding maps which translate features into a well-defined and prescient embedding space. Clustering or prediction may then be performed by a second machine learning model trained in this embedding space. Thus, methods and systems disclosed herein make use of explainability vectors to generate novel embedding maps on relevant features that improve accuracy in identifying similar user systems and benefit further predictions.

In some aspects, methods and systems are described herein comprising: receiving, for a first plurality of user systems, a first plurality of user profiles and a corresponding plurality of resource availability values, wherein each user profile includes values for a set of features; processing a first machine learning model to extract an explainability vector, wherein the first machine learning model receives as input values for the set of features and generates as output a corresponding resource availability value; using the explainability vector, generating an embedding map to translate a user profile comprising values for the set of features into a corresponding embedding in an embedding space; encoding, using the embedding map, a second plurality of user profiles for a second plurality of user systems to produce a plurality of user profile vectors; processing the plurality of user profile vectors using a second machine learning model to generate one or more clusters of user profile vectors; and selecting a cluster from the one or more clusters of user profile vectors and determining user systems corresponding to the cluster for executing resource availability notifications.

Various other aspects, features, and advantages of the systems and methods described herein will be apparent through the detailed description and the drawings attached hereto. It is also to be understood that both the foregoing general description and the following detailed description are examples and are not restrictive of the scope of the systems and methods described herein. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

DETAILED DESCRIPTION

In the following description, for the purposes of explanation, numerous specific details are set forth in order to provide a thorough understanding of the embodiments described herein. It will be appreciated, however, by those having skill in the art that the embodiments may be practiced without these specific details or with an equivalent arrangement. In other cases, well-known structures and devices are shown in block diagram form in order to avoid unnecessarily obscuring the embodiments.

Figure 1:
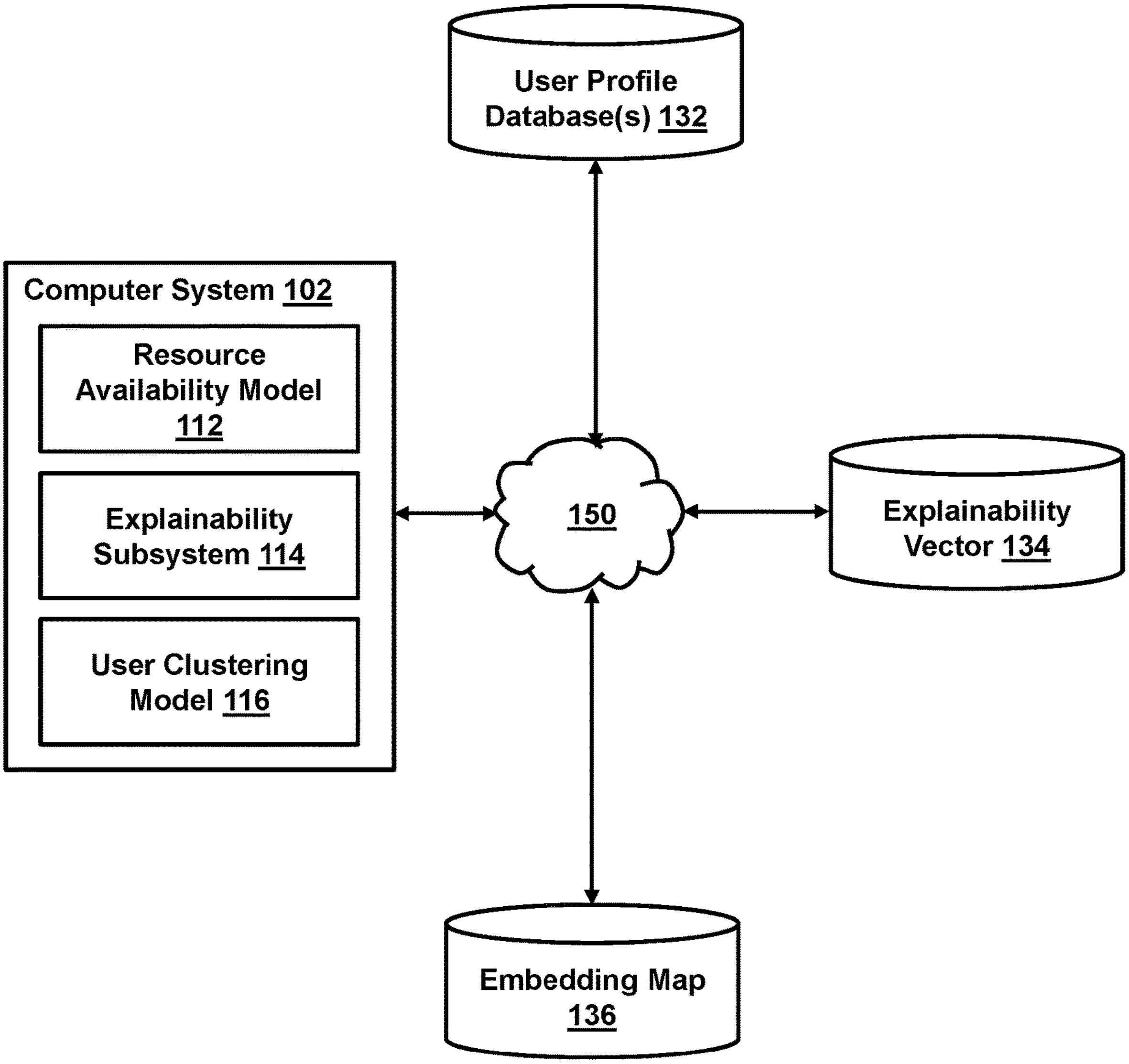
FIG. 1 shows an illustrative diagram for a system for executing resource availability notifications to user systems, in accordance with one or more embodiments.

FIG. 1 shows an illustrative diagram for system 150, which contains hardware and software components used for executing resource availability notifications to user systems, in accordance with one or more embodiments. For example, Computer System 102, a part of system 150, may include Resource Availability Model 112. Explainability Subsystem 114, and User Clustering Model 116.

System 150 (the system) may retrieve a plurality of user profiles from User Profile Database(s) 132. Each user profile in User Profile Database(s) 132 corresponds to a user system, and contains information described by a first set of features. The first set of features may contain categorical or quantitative variables, and values for such features may describe, for example, a length of time for which the user system has recorded resource consumption, an extent and frequency of resource consumption, and the number of instances of the user system's excessive resource consumption. Each user profile may correspond to a resource availability value indicating the current allowance of resources assigned to the user system, which may also be recorded in User Profile Database(s) 132 in association with the user profile. The system may retrieve a plurality of user profiles as a matrix including vectors of feature values for the first set of features and append to the end of each vector a resource availability value.

In some embodiments, the system may, before retrieving user profiles, process User Profile Database(s) 132 using a data cleansing process to generate a processed dataset. The data cleansing process may include removing outliers, standardizing data types, formatting and units of measurement, and removing duplicate data. The system may then retrieve vectors corresponding to user profiles from the processed dataset.

The system may train a first machine learning model (e.g., Resource Availability Model 112) based on a matrix representing the plurality of user profiles. Resource Availability Model 112 may take as input a vector of feature values for the first set of features and output a resource availability score indicating an amount of resources that should be assigned to a user system with such feature values as the input. Resource Availability Model 112 may use one or more algorithms like linear regression, generalized additive models, artificial neural networks or random forests to achieve quantitative prediction. The system may partition the matrix of user profiles into a training set and a cross-validating set. Using the training set, the system may train Resource Availability Model 112 using, for example, the gradient descent technique. The system may then cross-validate the trained model using the cross-validating set and further fine-tune the parameters of the model. Resource Availability Model 112 may include one or more parameters that it uses to translate input into outputs. For example, an artificial neural network contains a matrix of weights, each weight in which is a real number. The repeated multiplication and combination of weights transform input values to Resource Availability Model 112 into output values.

The system may use Explainability Subsystem 114 to extract an explainability vector (e.g., Explainability Vector 134) from Resource Availability Model 112. Explainability Subsystem 114 may employ a variety of explainability techniques depending on the algorithms in Resource Availability Model 112 to extract Explainability Vector 134. Explainability Vector 134 contains one entry for each feature in the set of features in the input to Resource Availability Model 112, and the entry reflects the importance of that feature to the model. The values within Explainability Vector 134 additionally represent how each feature correlates to the output of the model, and the causative effect of each feature in producing the output as construed by the model. In some embodiments, a correlation matrix may be attached to Explainability Vector 134. The correlation matrix captures how variables are correlated with other variables. This is relevant because correlation between variables in a model causes interference in their causative effects in producing the output of the model.

Below are some examples of how Explainability Subsystem 114 extracts Explainability Vector 134 from Resource Availability Model 112.

For example, Resource Availability Model 112 may contain a matrix of weights for a multivariate regression algorithm. Explainability Subsystem 114 may use a Shapley Additive Explanation method to extract Explainability Vector 134. Shapley Additive Explanation computes Shapley values in coalitional game theory, treating each feature in the input features of a model as participants in a coalition. Each feature therefore gets assigned a Shapley value capturing their contribution to producing the prediction of the model. The magnitude of Shapley values of each feature is then normalized. Explainability Vector 134 may be a list of normalized Shapley values of each feature.

In another example, Resource Availability Model 112 may contain a vector of coefficients for a generalized additive model. Since the nature of generalized additive models is such that the effect of each variable on the output is completely and independently captured by its coefficient, Explainability Subsystem 114 may take the list of coefficients to be Explainability Vector 134.

In another example, Resource Availability Model 112 may contain a matrix of weights for a supervised classifier algorithm. Explainability Subsystem 114 may use a Local Interpretable Model-agnostic Explanations method to extract Explainability Vector 134. The Local Interpretable Model-agnostic Explanations approximates the results of Resource Availability Model 112 with an explainable model, e.g., a decision tree classifier. The approximate model is trained using a loss heuristic that judges similarity to Resource Availability Model 112 and that penalizes complexity. In some embodiments, the number of variables that the approximate model uses can be specified. The approximate model will clearly define the effect of each feature on the output: for example, the approximate model may be a generalized additive model.

In another example, Resource Availability Model 112 may contain a matrix of weights for a convolutional neural network algorithm. Explainability Subsystem 114 may use a Gradient Class Activation Mapping method to extract Explainability Vector 134. The Grad-CAM technique performs backpropagation on the output of the model with respect to the final convolutional feature map to compute derivatives of features in the input with respect to the output of the model. The derivatives may then be used as indications of importance of features to a model, and Explainability Vector 134 may be a list of such derivatives.

In another example, Resource Availability Model 112 may contain a set of parameters comprising a hyperplane matrix for a support vector machine algorithm. Explainability Subsystem 114 may use a counterfactual explanation method to extract Explainability Vector 134. The counterfactual explanation method looks for input data which are identical or extremely close in values for all features except one. Then the difference in prediction results may divided by the difference in the divergent value. This process is repeated on each feature for all pairs of available input vectors, and the aggregated result is a measure for the effect of each feature on the output of the model, which may be formed into Explainability Vector 134.

After extracting Explainability Vector 134 from Resource Availability Model 112, the system may process the explainability vector using one or more filtering criteria to adjust the values corresponding to certain features. In some embodiments, these adjustments may be performed in response to a user request. For example, the system may receive a user request specifying that a subset of features be removed from consideration or that impact of the subset of features be reduced. In one example embodiment, the system may receive user profiles representing applicants for credit cards. A feature in the set of features may be the race or ethnicity of the applicant. The user may wish to exclude such features from consideration. Therefore, a subset of features to be removed may include, e.g., race and gender. The system may, in addition, calculate a threshold for removing features of the explainability vector. In some embodiments, the threshold may correspond to a pre-set real number, e.g., 0.45. In other embodiments, the system may simply remove the bottom 10% of features ranked by values in the explainability vector. Using the threshold, the system may add features to the subset of features to be removed. The system may apply a mathematical transformation to the explainability vector such that values corresponding to the subset of features are adjusted. For example, the values in the explainability vector for the subset of features may be set to zero, or the values may be halved.

The system may use Explainability Vector 134 to generate Embedding Map 136. Embedding Map 136 may be a series of rules and transformations that take a vector of input data (e.g., values for features in the first set of features), applies mathematical transformations like weight multiplications and Boolean combinations to the vector of input data, and produces an output vector which may be different in dimensionality and content from the input data. For example, an input vector of the values [23, 0.7, 100, 66, 80.4] may be taken into an embedding map. The embedding map may multiply the first feature by 1.774 to obtain the first output value. The embedding map may determine whether the second feature is greater than 0.5: if it is, the second output value is set to 1 and if not, it is set to 0. The embedding map may calculate a difference between the third and fourth features (e.g., 34) to be the third output value. The embedding map may ignore the fifth feature. Thus, the embedding map in this example takes an input vector of [23, 0.7, 100, 66, 80.4] and outputs a vector of values [40.802, 1, 34]. In another example, an embedding map may translate categorical variables. For example, the feature of "industry group" with the value of "real estate" may be represented as 503 in the output. The embedding map may store weights, rules, and other information in hardware and/or software.

Embedding Map 136 may be derived from Explainability Vector 134. For example, the values in Explainability Vector 134 corresponding to features may become weights for those features in Embedding Map 136. Embedding Map 136 may combine features with reference to Explainability Vector 134. For example, it may select features with low values in Explainability Vector 134 and map one or more such features into one output value. Embedding Map 136 may, for example, multiply the absolute values for three features to generate one output value. Alternatively, Embedding Map 136 may determine whether all three feature values exceed thresholds for each, output 1 if all values are above their respective thresholds, and output 0 otherwise. In some embodiments, Embedding Map 136 may use the correlation matrix attached with Explainability Vector 134 to determine which features to combine. In some embodiments, the system may use a deep neural network to learn weights and combination rules for Embedding Map 136 using Explainability Vector 134 as an input.

The system may use Embedding Map 136 to encode a second plurality of user profiles. Embedding Map 136 may take a plurality of vectors, each containing a set of values for the first set of features and describing a user profile. Embedding Map 136 may then produce an output of a real-valued vector in an embedding space. These embedded vectors may then be processed by a second machine learning model, e.g., User Clustering Model 116, to identify degrees of similarity between one or more users or user systems.

User Clustering Model 116 identifies user systems similar to a particular user system using the embedded vector of that user system. For example, User Clustering Model 116 may generate clusters of user profiles, where user profiles in a cluster are similar to each other. User Clustering Model 116 is trained to perform clustering around the feature vector to find similar user systems. User Clustering Model 116 may use one or more clustering algorithms like K-means clustering. Prototype Networks, or Gaussian Mixed Models for points in the real-valued embedding space. User Clustering Model 116 may output a cluster that the input user system is in through a list of user systems determined to be similar to the input user system. System 150 may use the identified cluster of similar user systems to, for example, determine product recommendations to the input user system. If applicants similar to a banking customer have been eligible for a particular credit card, the system may use the customer's placement in a cluster to determine a high probability of being eligible for that credit card.

In some embodiments, the output of User Clustering Model 116 may be labeled with metadata indicating the extent and nature of the similarity between each similar user system and the input user system. For example, User Clustering Model 116 may return a list of numerical scores each indicating a degree of similarity between a similar user system and the input user system (e.g., the distance in the embedding space between the similar user system and the input user system). User Clustering Model 116 may also return a list of descriptions, each description in which shows the category of demographic data in which the similar user system is most like the input user system.

Figure 2:
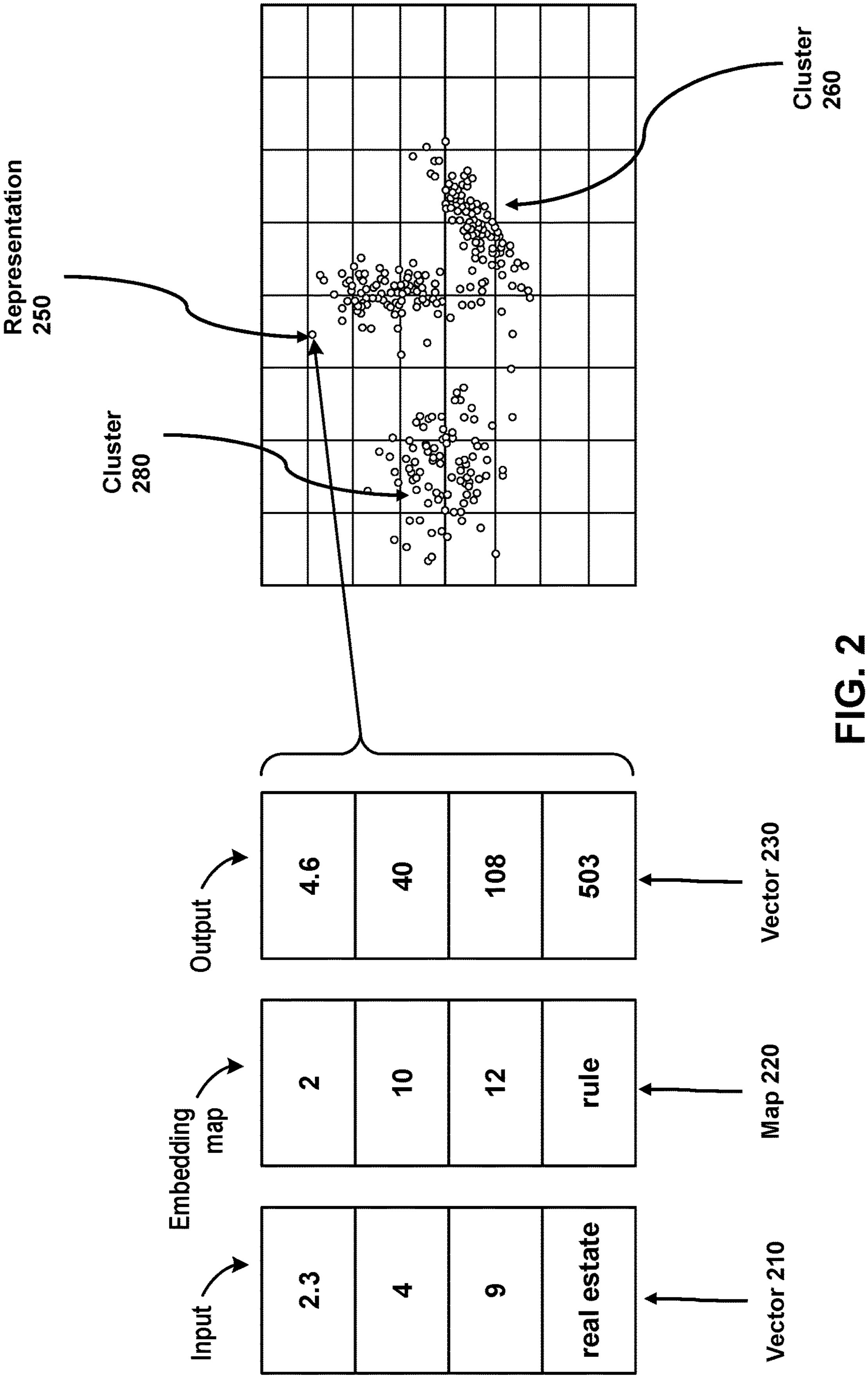
FIG. 2 show an illustration of an input vector being embedded for comparison to other vectors in an embedding space, in accordance with one or more embodiments.

FIG. 2 is a demonstration of an embedding map (e.g., Embedding Map 136) transforming an input vector into an output vector which may be represented in a real-valued embedding space. The input vector, Vector 210, contains four values corresponding to four features which constitute the first set of features. For example, Vector 210 may represent a user profile for a commercial lending applicant, and the user may be a corporation. The features may be gross profit margin, lines of credit outstanding, free cash flow per annum, and the type of industry the user is in. The first three features are quantitative, and the fourth is categorical. Vector 210 shows values for each feature, namely [2.3, 4, 9, "real estate"]. Map 220 may transform Vector 210 and other vectors of feature values into embedded vectors like Vector 230. Map 220 contains a list of weights [2, 10, 12] and a rule for handling the categorical input. Map 220 may apply a weight multiplication onto the quantitative variables in Vector 210 to produce the values [4.6, 40, 108]. Then it may use the rule to translate "real estate" into 503. Therefore, the embedded Vector 230 includes [4.6, 40, 108, 503] and encapsulates the user profile in the real-valued embedding space. Representation 250 shows the user profile being compared alongside a plurality of other user profiles represented in the real-valued embedding space. A machine learning model (e.g., User Clustering Model 116) may have formed the plurality of user profiles into two clusters: Cluster 280 and Cluster 260.

Figure 3:
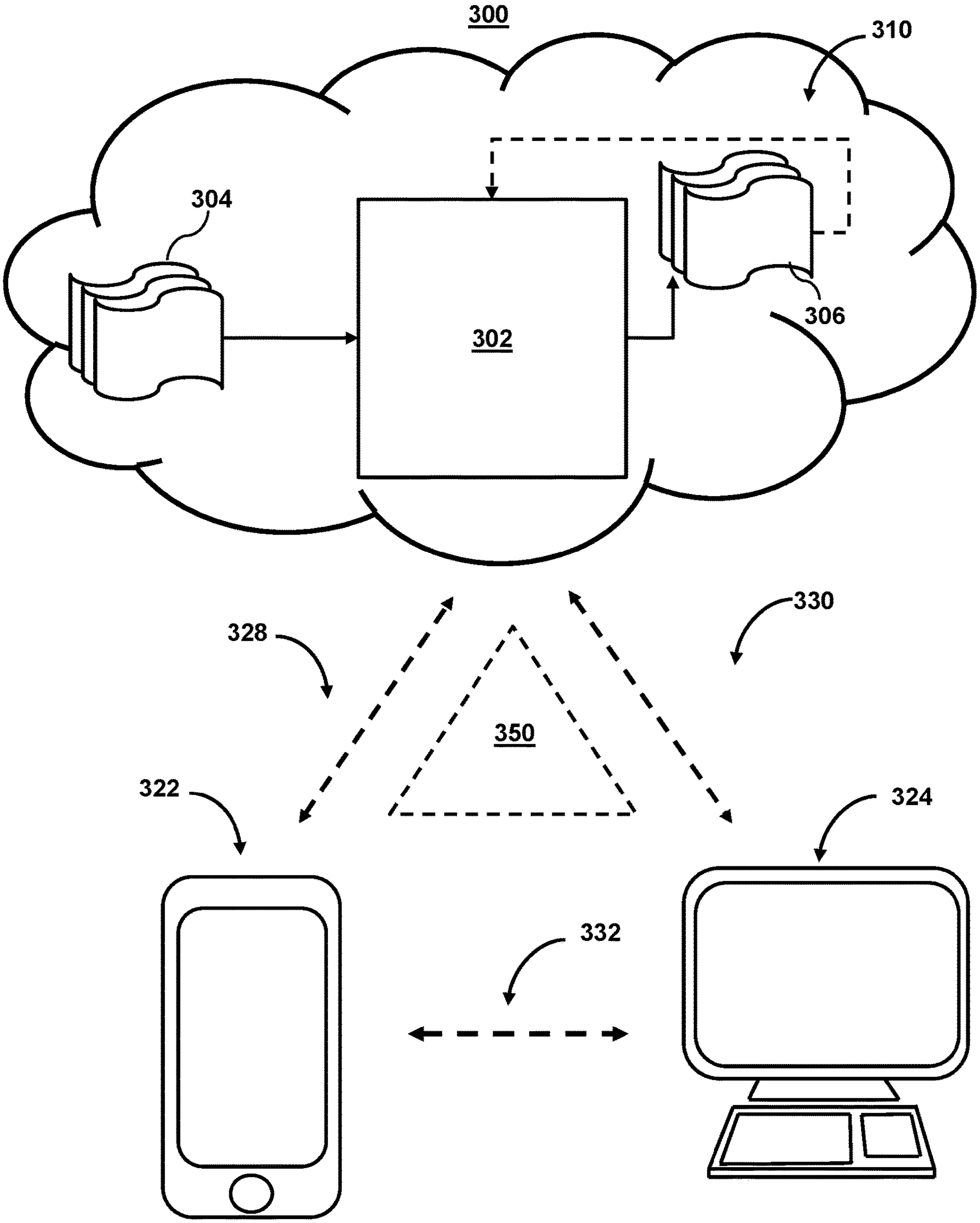
FIG. 3 shows illustrative components for a system for executing resource availability notifications to user systems, in accordance with one or more embodiments.

FIG. 3 shows illustrative components for a system for executing resource availability notifications to user systems, in accordance with one or more embodiments. As shown in FIG. 3, system 300 may include mobile device 322 and user terminal 324. While shown as a smartphone and personal computer, respectively, in FIG. 3, it should be noted that mobile device 322 and user terminal 324 may be any computing device, including, but not limited to, a laptop computer, a tablet computer, a hand-held computer, and other computer equipment (e.g., a server), including "smart," wireless, wearable, and/or mobile devices. FIG. 3 also includes cloud components 310. Cloud components 310 may alternatively be any computing device as described above, and may include any type of mobile terminal, fixed terminal, or other device. For example, cloud components

310 may be implemented as a cloud computing system, and may feature one or more component devices. It should also be noted that system 300 is not limited to three devices. Users may, for instance, utilize one or more devices to interact with one another, one or more servers, or other components of system 300. It should be noted, that, while one or more operations are described herein as being performed by particular components of system 300, these operations may, in some embodiments, be performed by other components of system 300. As an example, while one or more operations are described herein as being performed by components of mobile device 322, these operations may, in some embodiments, be performed by components of cloud components 310. In some embodiments, the various computers and systems described herein may include one or more computing devices that are programmed to perform the described functions. Additionally, or alternatively, multiple users may interact with system 300 and/or one or more components of system 300. For example, in one embodiment, a first user and a second user may interact with system 300 using two different components.

With respect to the components of mobile device 322, user terminal 324, and cloud components 310, each of these devices may receive content and data via input/output (hereinafter "I/O") paths. Each of these devices may also include processors and/or control circuitry to send and receive commands, requests, and other suitable data using the I/O paths. The control circuitry may comprise any suitable processing, storage, and/or input/output circuitry. Each of these devices may also include a user input interface and/or user output interface (e.g., a display) for use in receiving and displaying data. For example, as shown in FIG. 3, both mobile device 322 and user terminal 324 include a display upon which to display data (e.g., conversational response, queries, and/or notifications).

Additionally, as mobile device 322 and user terminal 324 are shown as touchscreen smartphones, these displays also act as user input interfaces. It should be noted that in some embodiments, the devices may have neither user input interfaces nor displays, and may instead receive and display content using another device (e.g., a dedicated display device such as a computer screen, and/or a dedicated input device such as a remote control, mouse, voice input, etc.). Additionally, the devices in system 300 may run an application (or another suitable program). The application may cause the processors and/or control circuitry to perform operations related to generating dynamic conversational replies, queries, and/or notifications.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3 also includes communication paths 328, 330, and 332. Communication paths 328, 330, and 332 may include the Internet, a mobile phone network, a mobile voice or data network (e.g., a 5G or LTE network), a cable network, a public switched telephone network, or other types of communications networks or combinations of communications networks. Communication paths 328, 330, and 332 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Cloud components 310 may include model 302, which may be a machine learning model, artificial intelligence model, etc. (which may be referred collectively as "models" herein). Model 302 may take inputs 304 and provide outputs 306. The inputs may include multiple datasets, such as a training dataset and a test dataset. Each of the plurality of datasets (e.g., inputs 304) may include data subsets related to user data, predicted forecasts and/or errors, and/or actual forecasts and/or errors. In some embodiments, outputs 306 may be fed back to model 302 as input to train model 302 (e.g., alone or in conjunction with user indications of the accuracy of outputs 306, labels associated with the inputs, or with other reference feedback information). For example, the system may receive a first labeled feature input, wherein the first labeled feature input is labeled with a known prediction for the first labeled feature input. The system may then train the first machine learning model to classify the first labeled feature input with the known prediction (e.g., predicting resource allocation values for user systems).

In a variety of embodiments, model 302 may update its configurations (e.g., weights, biases, or other parameters) based on the assessment of its prediction (e.g., outputs 306) and reference feedback information (e.g., user indication of accuracy, reference labels, or other information). In a variety of embodiments, where model 302 is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the model 302 may be trained to generate better predictions.

In some embodiments, model 302 may include an artificial neural network. In such embodiments, model 302 may include an input layer and one or more hidden layers. Each neural unit of model 302 may be connected with many other neural units of model 302. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 302 may be self-learning and trained, rather than explicitly programmed, and can perform significantly better in certain areas of problem solving, as compared to traditional computer programs. During training, an output layer of model 302 may correspond to a classification of model 302, and an input known to correspond to that classification may be input into an input layer of model 302 during training. During testing, an input without a known classification may be input into the input layer, and a determined classification may be output.

In some embodiments, model 302 may include multiple layers (e.g., where a signal path traverses from front layers to back layers). In some embodiments, back propagation techniques may be utilized by model 302 where forward stimulation is used to reset weights on the "front" neural units. In some embodiments, stimulation and inhibition for model 302 may be more free-flowing, with connections interacting in a more chaotic and complex fashion. During testing, an output layer of model 302 may indicate whether or not a given input corresponds to a classification of model 302 (e.g., predicting resource allocation values for user systems).

In some embodiments, the model (e.g., model 302) may automatically perform actions based on outputs 306. In some embodiments, the model (e.g., model 302) may not perform any actions. The output of the model (e.g., model 302) may be used to predict predicting resource allocation values for user systems).

System 300 also includes API layer 350. API layer 350 may allow the system to generate summaries across different devices. In some embodiments, API layer 350 may be implemented on mobile device 322 or user terminal 324. Alternatively or additionally, API layer 350 may reside on one or more of cloud components 310. API layer 350 (which may be A REST or Web services API layer) may provide a decoupled interface to data and/or functionality of one or more applications. API layer 350 may provide a common, language-agnostic way of interacting with an application. Web services APIs offer a well-defined contract, called WSDL, that describes the services in terms of its operations and the data types used to exchange information. REST APIs do not typically have this contract; instead, they are documented with client libraries for most common languages, including Ruby, Java, PHP, and JavaScript. SOAP Web services have traditionally been adopted in the enterprise for publishing internal services, as well as for exchanging information with partners in B2B transactions.

API layer 350 may use various architectural arrangements. For example, system 300 may be partially based on API layer 350, such that there is strong adoption of SOAP and RESTful Web-services, using resources like Service Repository and Developer Portal, but with low governance, standardization, and separation of concerns. Alternatively, system 300 may be fully based on API layer 350, such that separation of concerns between layers like API layer 350, services, and applications are in place.

In some embodiments, the system architecture may use a microservice approach. Such systems may use two types of layers: Front-End Layer and Back-End Layer where microservices reside. In this kind of architecture, the role of the API layer 350 may provide integration between Front-End and Back-End. In such cases, API layer 350 may use RESTful APIs (exposition to front-end or even communication between microservices). API layer 350 may use AMQP (e.g., Kafka, RabbitMQ, etc.). API layer 350 may use incipient usage of new communications protocols such as gRPC, Thrift, etc.

In some embodiments, the system architecture may use an open API approach. In such cases, API layer 350 may use commercial or open-source API Platforms and their modules. API layer 350 may use a developer portal. API layer 350 may use strong security constraints applying WAF and DDOS protection, and API layer 350 may use RESTful APIs as standard for external integration.

Figure 4:
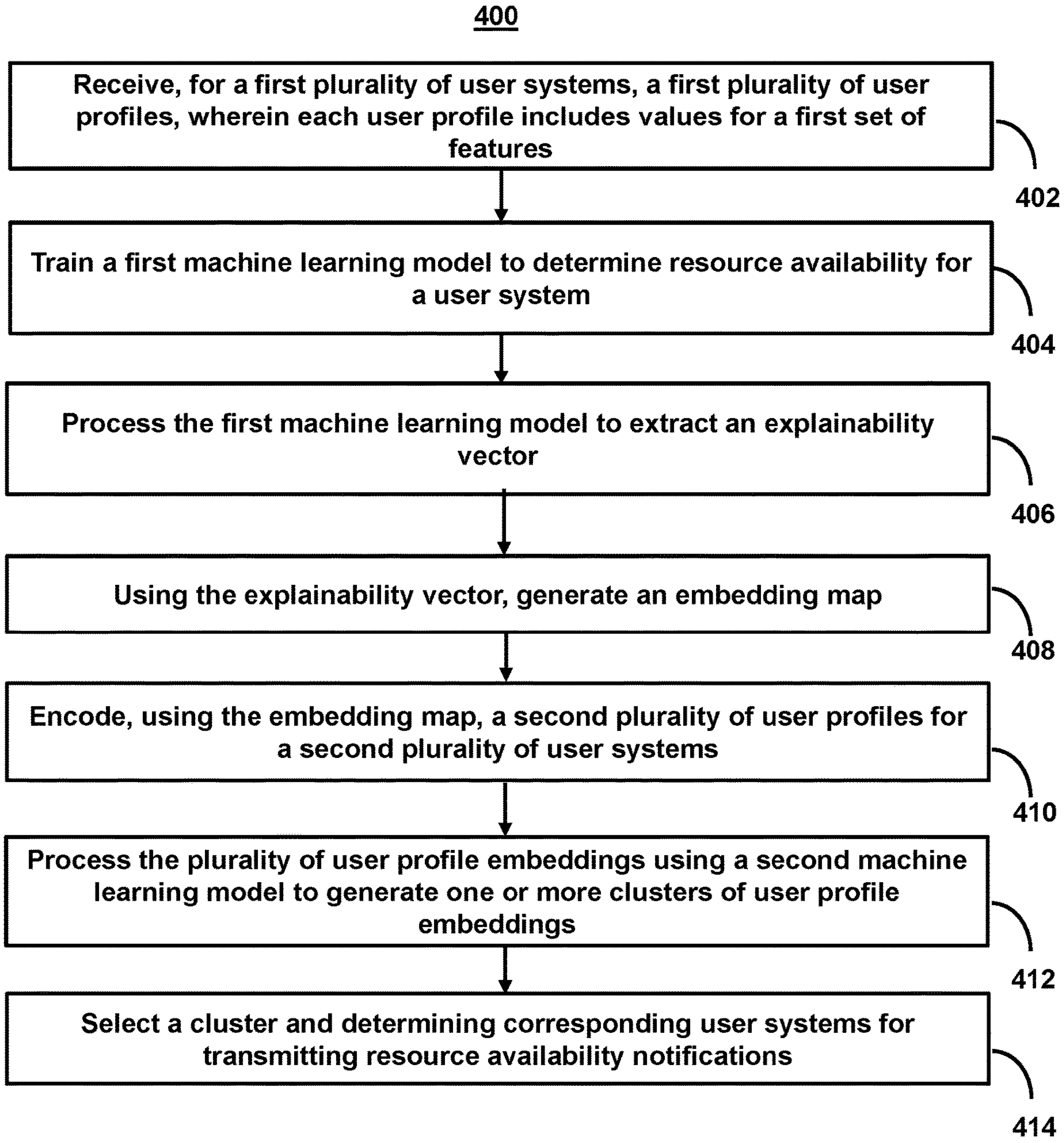
FIG. 4 shows a flowchart of the steps involved in executing resource availability notifications to user systems, in accordance with one or more embodiments.

FIG. 4 shows a flowchart of the steps involved in executing resource availability notifications to user systems, in accordance with one or more embodiments. For example, the system may use process 400 (e.g., as implemented on one or more system components described above) in order to collect and process data about a user system, select similar user systems, and select among a plurality of actions that reduce resource consumption for the user system.

At step 402, process 400 (e.g., using one or more components described above) may receive, for a first plurality of user systems, a first plurality of user profiles, where each user profile includes values for a first set of features. For example, the system may use one or more software components (e.g., application programming interfaces) to access User Profile Database(s) 132 and retrieve a dataset each entry for which corresponds to a user. A user profile may be described by values in the first set of features. The first set of features may include quantitative or categorical variables. For example, the first set of features may include length of credit history, revolving credit utilization, credit lines and types of credit for a dataset relating to the creditworthiness of individuals. In some embodiments, the system may process the dataset of user profiles or User Profile Database(s) 132 using a data cleansing process to generate a processed dataset. The data cleansing process may include removing outliers, standardizing data types, formatting and units of measurement, and removing duplicate data. By collecting high-quality user profile data, the system may fully inform models that determine resource availability for user systems.

At step 404, process 400 (e.g., using one or more components described above) may train a first machine learning model to determine resource availability for a user system. To do so, the system may retrieve one or more user profiles from User Profile Database(s) 132 and combine corresponding resource availability values with the user profiles to generate a dataset. The dataset may then be divided into a training set and a cross-validating set. The system may train the first machine learning model (e.g., Resource Availability Model 112) using the training set and tune parameters using the cross-validating set. The first machine learning model receives as input values for the set of features within User Profile Database(s) 132 and generates as output a corresponding resource availability value.

At step 406, process 400 (e.g., using one or more components described above) may process the first machine learning model to extract an explainability vector. Each entry in the explainability vector may correspond to a feature in a set of features and may be indicative of a correlation between the feature and output of the first machine learning model. To do so, the system may use Explainability Subsystem 114. For example, if the first machine learning model is defined by a set of parameters comprising a matrix of weights for a multivariate regression algorithm, the explainability vector may be extracted from the set of parameters using the Shapley Additive Explanation method. For example, if the first machine learning model is defined by a set of parameters comprising a matrix of weights for a supervised classifier algorithm, the explainability vector may be extracted from the set of parameters using the Local Interpretable Model-agnostic Explanations method. For example, if the first machine learning model is defined by a set of parameters comprising a vector of coefficients for a generalized additive model, the explainability vector may be extracted from the vector of coefficients in the generalized additive model. For example, if the first machine learning model is defined by a set of parameters comprising a matrix of weights for a convolutional neural network algorithm, the explainability vector may be extracted from the set of parameters using the Gradient Class Activation Mapping method. For example, if the first machine learning model is defined by a set of parameters comprising a hyperplane matrix for a support vector machine algorithm, the explainability vector may be extracted from the set of parameters using the counterfactual explanation method. The explainability vector thus extracted (e.g., Explainability Vector 134) has the same number of entries as features in the first set of features. Each entry in this explainability vector represents the impact that a particular feature has on the model output.

At step 408, process 400 (e.g., using one or more components described above) may, using the explainability vector, generate an embedding map. In some embodiments, the embedding map may recombine at least some of the set of features into one or more features for the embedding space based on the explainability vector. In some embodiments, the system may first adjust values in the explainability vector. For example, the system may receive a user request specifying that a subset of features be removed from consideration or that impact of the subset of features be reduced. The system may also calculate a threshold for removing features of the explainability vector and add features below the threshold to the subset of features. This threshold may remove features deemed unimportant and may be a particular value in the explainability vector (e.g., 0.25). In some embodiments, this threshold can be a predetermined set number; in some other embodiments the threshold may be selected from the explainability vector. The system may apply a mathematical transformation to the explainability vector such that values corresponding to the subset of features are adjusted. In some embodiments, the values may be set to 0 to remove the corresponding features from consideration. In some embodiments, a percentage may be subtracted from the values to downplay their impact.

The system may process the explainability vector to generate an embedding map (e.g., embedding map 136) for translating a user profile comprising values for a set of features into a corresponding embedding in an embedding space. In some embodiments, the embedding map may be a convolution that multiplies the normalized values for a given quantitative feature by the value of the feature in the explainability vector. The embedding map may develop a separate set of pointers that translate each category of a given categorical feature into a numerical representation. The numerical representation may similarly be multiplied by the value of the feature in the explainability vector.

At step 410, process 400 (e.g., using one or more components described above) may encode, using the embedding map, a second plurality of user profiles for a second plurality of user systems. The system may receive as input a vector of feature values representing a user profile of the second plurality of user profiles, where each feature value corresponds to a feature in the set of features, and where the vector of feature values comprises quantitative feature values and categorical feature values. The system may apply a preset vector of weights (e.g., the quantitative portion of the embedding map) to the quantitative feature values to generate new quantitative values for the quantitative feature values. The system may use a set of deterministic rules to generate quantitative values for categorical feature values, like was described above using the embedding map. The system may then output, in the real-valued embedding space, the new quantitative values for the quantitative feature values and quantitative values for categorical feature values.

At step 412, process 400 (e.g., using one or more components described above) may process the plurality of user profile embeddings using a second machine learning model to generate one or more clusters of user profile embeddings. For example, the system may use User Clustering Model 116 to perform unsupervised clustering to place user systems into one or more groups. The unsupervised clustering may use a distance metric in the real-valued embedding space and may use a clustering algorithm like K-means. Each group may contain users similar to each other in important respects, since the embedding map amplifies differences along dimensions that scored highly in the explainability vector. The groups may allow the system to identify similar users to a particular user, and the system may therefore determine an average resource availability score among the similar users. The average resource availability score may be associated with the particular user and used as continuous training data for Resource Availability Model 112.

At step 414, process 400 (e.g., using one or more components described above) may select a cluster and determine corresponding user systems for transmitting resource availability notifications. For a particular user system, the group of users to which it is closest in the embedding space may form this cluster. The user systems in this cluster may be selected to receive a resource availability notification reflective of the resource availability of one or more other users in this cluster. The resource availability notification indicates resources for which they may be eligible considering their similarity along features in the embedding space to other users in this cluster.

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 4.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A system for generating system alerts, the system comprising: receiving, for a first plurality of user systems, a first plurality of user profiles and a corresponding plurality of resource availability values, wherein each user profile includes values for a set of features; using values for the set of features from the first plurality of user profiles and the corresponding plurality of resource availability values, training a first machine learning model to determine resource availability for a user system, wherein the first machine learning model receives as input values for the set of features and generates as output a corresponding resource availability value; processing the first machine learning model to extract an explainability vector, wherein each entry in the explainability vector corresponds to a feature in the set of features and is indicative of a correlation between the feature and the output of the first machine learning model; using the explainability vector, generating an embedding map to translate a user profile comprising values for the set of features into a corresponding embedding in an embedding space, wherein the embedding map recombines at least some of the set of features into one or more features for the embedding space based on the explainability vector; encoding, using the embedding map, a second plurality of user profiles for a second plurality of user systems to produce a plurality of user profile vectors; processing the plurality of user profile vectors using a second machine learning model to generate one or more clusters of user profile vectors; and selecting a cluster from the one or more clusters of user profile vectors and determining user systems corresponding to the cluster for executing resource availability notifications.
2. A method, the method comprising: receiving, for a first plurality of user systems, a first plurality of user profiles and a corresponding plurality of resource availability values, wherein each user profile includes values for a set of features; processing a first machine learning model to extract an explainability vector, wherein the first machine learning model receives as input values for the set of features and generates as output a corresponding resource availability value; using the explainability vector, generating an embedding map to translate a user profile comprising values for the set of features into a corresponding embedding in an embedding space; encoding, using the embedding map, a second plurality of user profiles for a second plurality of user systems to produce a plurality of user profile vectors; processing the plurality of user profile vectors using a second machine learning model to generate one or more clusters of user profile vectors; and selecting a cluster from the one or more clusters of user profile vectors and determining user systems corresponding to the cluster for executing resource availability notifications.
3. A method, the method comprising: receiving an embedding map for translating a user profile comprising values for a set of features into a corresponding embedding in an embedding space; encoding, using the embedding map, a plurality of user profiles for a plurality of user systems to produce a plurality of user profile vectors, wherein each user profile comprises values for the set of features; processing the plurality of user profile vectors using a machine learning model to generate one or more clusters of user profile vectors; and selecting a cluster from the one or more clusters of user profile vectors and determining user systems corresponding to the cluster for executing resource availability notifications.
4. The method of any one of the preceding embodiments, further comprising using values for the set of features from the first plurality of user profiles and the corresponding plurality of resource availability values, training the first machine learning model to determine resource availability for a user system.
5. The method of any one of the preceding embodiments, wherein generating an embedding map using the explainability vector comprises processing the explainability vector using one or more filtering criteria, comprising: receiving a user request specifying that a subset of features be removed from consideration or that impact of the subset of features be reduced; calculating a threshold for removing features of the explainability vector; adding features below the threshold to the subset of features; and applying a mathematical transformation to the explainability vector such that values corresponding to the subset of features are adjusted.
6. The method of any one of the preceding embodiments, wherein: the first machine learning model is defined by a set of parameters comprising a matrix of weights for a multivariate regression algorithm; and the explainability vector is extracted from the set of parameters using the Shapley Additive Explanation method.
7. The method of any one of the preceding embodiments, wherein: the first machine learning model is defined by a set of parameters comprising a matrix of weights for a supervised classifier algorithm; and the explainability vector is extracted from the set of parameters using the Local Interpretable Model-agnostic Explanations method.
8. The method of any one of the preceding embodiments, wherein: the first machine learning model is defined by a set of parameters comprising a vector of coefficients for a generalized additive model; and the explainability vector is extracted from the vector of coefficients in the generalized additive model.
9. The method of any one of the preceding embodiments, wherein: the first machine learning model is defined by a set of parameters comprising a matrix of weights for a convolutional neural network algorithm; and the explainability vector is extracted from the set of parameters using the Gradient Class Activation Mapping method.
10. The method of any one of the preceding embodiments, wherein: the first machine learning model is defined by a set of parameters comprising a hyperplane matrix for a support vector machine algorithm; and the explainability vector is extracted from the set of parameters using the counterfactual explanation method.
11. The method of any one of the preceding embodiments, wherein using encoding, using the embedding map, a second plurality of user profiles for a second plurality of user systems to produce a corresponding plurality of user profile vectors comprises: receiving as input a vector of feature values representing a user profile of the second plurality of user profiles, wherein each feature value corresponds to a feature in the set of features, and wherein the vector of feature values comprises quantitative feature values and categorical feature values; applying a preset vector of weights to the quantitative feature values to generate new quantitative values for the quantitative feature values; using a set of deterministic rules to generate quantitative values for categorical feature values; and outputting the new quantitative values for the quantitative feature values and quantitative values for categorical feature values.

12. The method of any one of the preceding embodiments, wherein the output of the second machine learning model is used as continuous training data for the first machine learning model.

What is claimed is:

1. A system for generating system alerts to user systems, the system comprising:

receiving, for a first plurality of user systems, a first plurality of user profiles and a corresponding plurality of resource availability values, wherein each user profile includes values for a set of features;

using values for the set of features from the first plurality of user profiles and the corresponding plurality of resource availability values, training a first machine learning model to determine resource availability for a user system, wherein the first machine learning model receives as input values for the set of features and generates as output a corresponding resource availability value;

processing the first machine learning model to extract an explainability vector, wherein each entry in the explainability vector corresponds to a feature in the set of features and is indicative of a correlation between the feature and the output of the first machine learning model;

using the explainability vector, generating an embedding map to translate a user profile comprising values for the set of features into a corresponding embedding in an embedding space, wherein the embedding map recombines at least some of the set of features into one or more features for the embedding space based on the explainability vector;

encoding, using the embedding map, a second plurality of user profiles for a second plurality of user systems to produce a plurality of user profile vectors;

processing the plurality of user profile vectors using a second machine learning model to generate one or more clusters of user profile vectors; and selecting a cluster from the one or more clusters of user profile vectors and determining user systems corresponding to the cluster for executing resource availability notifications.

2. A method, the method comprising:

receiving, for a first plurality of user systems, a first plurality of user profiles and a corresponding plurality of resource availability values, wherein each user profile includes values for a set of features;

processing a first machine learning model to extract an explainability vector, wherein the first machine learning model receives as input values for the set of features and generates as output a corresponding resource availability value;

using the explainability vector, generating an embedding map to translate a user profile comprising values for the set of features into a corresponding embedding in an embedding space;

encoding, using the embedding map, a second plurality of user profiles for a second plurality of user systems to produce a plurality of user profile vectors;

processing the plurality of user profile vectors using a second machine learning model to generate one or more clusters of user profile vectors; and selecting a cluster from the one or more clusters of user profile vectors and determining user systems corresponding to the cluster for executing resource availability notifications.

3. The method of claim 2, further comprising:

using values for the set of features from the first plurality of user profiles and the corresponding plurality of resource availability values, training the first machine learning model to determine resource availability for a user system.

4. The method of claim 2, wherein generating an embedding map using the explainability vector comprises processing the explainability vector using one or more filtering criteria, comprising:

receiving a user request specifying that a subset of features be removed from consideration or that impact of the subset of features be reduced;

calculating a threshold for removing features of the explainability vector;

adding features below the threshold to the subset of features; and applying a mathematical transformation to the explainability vector such that values corresponding to the subset of features are adjusted.

5. The method of claim 2, wherein:

the first machine learning model is defined by a set of parameters comprising a matrix of weights for a multivariate regression algorithm; and the explainability vector is extracted from the set of parameters using a Shapley Additive Explanation method.

6. The method of claim 2, wherein:

the first machine learning model is defined by a set of parameters comprising a matrix of weights for a supervised classifier algorithm; and the explainability vector is extracted from the set of parameters using a Local Interpretable Model-agnostic Explanations method.

7. The method of claim 2, wherein:

the first machine learning model is defined by a set of parameters comprising a vector of coefficients for a generalized additive model; and the explainability vector is extracted from the vector of coefficients in the generalized additive model.

8. The method of claim 2, wherein:

the first machine learning model is defined by a set of parameters comprising a matrix of weights for a convolutional neural network algorithm; and the explainability vector is extracted from the set of parameters using a Gradient Class Activation Mapping method.

9. The method of claim 2, wherein:

the first machine learning model is defined by a set of parameters comprising a hyperplane matrix for a support vector machine algorithm; and the explainability vector is extracted from the set of parameters using a counterfactual explanation method.

10. The method of claim 2, wherein using encoding, using the embedding map, a second plurality of user profiles for a second plurality of user systems to produce a corresponding plurality of user profile vectors comprises:

receiving as input a vector of feature values representing a user profile of the second plurality of user profiles, wherein each feature value corresponds to a feature in the set of features, and wherein the vector of feature values comprises quantitative feature values and categorical feature values;

applying a preset vector of weights to the quantitative feature values to generate new quantitative values for the quantitative feature values;

using a set of deterministic rules to generate quantitative values for categorical feature values; and outputting the new quantitative values for the quantitative feature values and quantitative values for categorical feature values.

11. The method of claim 2, wherein the output of the second machine learning model is used as continuous training data for the first machine learning model.

12. One or more non-transitory computer-readable media comprising instructions that, when executed by one or more processors, cause operations comprising:

receiving values for a set of features;

processing the values, for the set of features, using a first machine learning model, to extract an explainability vector;

generating, using the explainability vector, an embedding map for translating a user profile into a corresponding embedding in an embedding space, wherein entries in the explainability vector correspond to the set of the features;

encoding, using the embedding map, a plurality of user profiles for a plurality of user systems to produce a plurality of user profile vectors, wherein each user profile comprises values for the set of features;

processing the plurality of user profile vectors using a second machine learning model to generate one or more clusters of user profile vectors; and selecting a cluster from the one or more clusters of user profile vectors and determining user systems corresponding to the cluster for executing resource availability notifications.

13. The one or more non-transitory computer-readable media of claim 12, wherein generating the embedding map comprises:

using values for the set of features from a first plurality of user profiles and a corresponding plurality of resource availability values, training the first machine learning model to determine resource availability for a user system, wherein the first machine learning model receives as input values for the set of features and generates as output a corresponding resource availability value;

processing the first machine learning model to extract the explainability vector, wherein each entry of the entries in the explainability vector corresponds to a feature in the set of features and is indicative of a correlation between the feature and the output of the first machine learning model; and using the explainability vector, generating the embedding map to translate a user profile comprising values for the set of features into a corresponding embedding in an embedding space, wherein the embedding map recombines at least some of the set of features into one or more features for the embedding space based on the explainability vector.

14. The one or more non-transitory computer-readable media of claim 13, wherein the embedding map is generated by processing the explainability vector using one or more filtering criteria, comprising:

receiving a user request specifying that a subset of features be removed from consideration or that impact of the subset of features be reduced;

calculating a threshold for removing features of the entries in the explainability vector;

adding features below the threshold to the subset of features; and applying a mathematical transformation to the explainability vector such that values corresponding to the subset of features are adjusted.

15. The one or more non-transitory computer-readable media of claim 13, wherein:

the first machine learning model is defined by a set of parameters comprising a matrix of weights for a multivariate regression algorithm; and the entries of the explainability vector are extracted from the set of parameters using a Shapley Additive Explanation method.

16. The one or more non-transitory computer-readable media of claim 13, wherein:

the first machine learning model is defined by a set of parameters comprising a matrix of weights for a supervised classifier algorithm; and the entries of the explainability vector are extracted from the set of parameters using a Local Interpretable Model-agnostic Explanations method.

17. The one or more non-transitory computer-readable media of claim 13, wherein:

the first machine learning model is defined by a set of parameters comprising a vector of coefficients for a generalized additive model; and the entries of the explainability vector are extracted from the vector of coefficients in the generalized additive model.

18. The one or more non-transitory computer-readable media of claim 13, wherein:

the first machine learning model is defined by a set of parameters comprising a matrix of weights for a convolutional neural network algorithm; and the entries of the explainability vector are extracted from the set of parameters using a Gradient Class Activation Mapping method.

19. The one or more non-transitory computer-readable media of claim 13, wherein:

the first machine learning model is defined by a set of parameters comprising a hyperplane matrix for a support vector machine algorithm; and the entries of the explainability vector are extracted from the set of parameters using a counterfactual explanation method.

20. The one or more non-transitory computer-readable media of claim 12, wherein encoding, using the embedding map, a plurality of user profiles for a plurality of user systems to produce a corresponding plurality of user profile vectors comprises:

receiving as input a vector of feature values representing a user profile of the plurality of user profiles, wherein each feature value corresponds to a feature in the set of features, and wherein the vector of feature values comprises quantitative feature values and categorical feature values;

applying a preset vector of weights to the quantitative feature values to generate new quantitative values for the quantitative feature values;

using a set of deterministic rules to generate quantitative values for categorical feature values; and outputting the new quantitative values for the quantitative feature values and quantitative values for categorical feature values.

* * * * *